United States Patent [19]
Loesch et al.

[11] 3,824,871
[45] July 23, 1974

[54] DRIVE FOR BUNK FEEDER

[76] Inventors: Leo J. Loesch; Claude E. Loesch, both of Kimball, Minn. 55353

[22] Filed: Feb. 22, 1973

[21] Appl. No.: 334,587

[52] U.S. Cl. ..................................... 74/422, 74/37
[51] Int. Cl. .................... F16h 19/06, F16h 1/04
[58] Field of Search ........................ 74/422, 465, 37

[56] References Cited
UNITED STATES PATENTS

| | | | |
|---|---|---|---|
| 2,346,424 | 4/1944 | Griffith | 74/422 |
| 3,108,488 | 10/1963 | Huszar | 74/465 |
| 3,151,495 | 10/1964 | Kurtz | 74/413 |
| 3,399,578 | 9/1968 | Lindabury, Sr. et al. | 74/422 X |
| 3,581,666 | 6/1971 | Bertin | 74/422 |

*Primary Examiner*—Leonard H. Gerim
*Attorney, Agent, or Firm*—H. Dale Palmatier; James R. Haller

[57] ABSTRACT

A drive producing the lineal motion of a slide and particularly a sliding pan of a bunk feeder, the drive includes an endless roller chain, a rack affixed to the sliding part and meshed with and driven by the roller chain, the roller chain having a drive run extending linearly between spaced guide rolls and meshed with the rack, the roller to roller pitch length of the chain slightly exceeding the tooth to tooth pitch length of the rack.

7 Claims, 4 Drawing Figures

DRIVE FOR BUNK FEEDER

BACKGROUND OF THE INVENTION

There is a need to produce linear motion, such as the sliding of a pan along a track, from power supplied by rotary motor. A typical installation of this type is a distributing mechanism for linearly moving a pan above a bunk feeder in a cattle feeding operation so as to distribute the feed rather uniformly along the entire length of the bunk. Although such drive mechanisms have been heretofore known, various problems have been encountered. Oftentimes it is the problem of excessive wear that requires the drive mechanism to become extremely expensive in design so as to minimize the wear problem.

Oftentimes the guiding of the pan or other part moving in the linear motion becomes a problem because in drives known in the past, the pan would tend to lift up away from the drive connection, particularly when pulling a heavy load.

SUMMARY OF THE INVENTION

The present invention is a drive for producing linear motion of a machine part such as a reciprocating pan for distributing feed along a bunk feeder. The linearly moving pan does not have any tendency to raise up during driving so that constant driving can be assured. The linearly moving part or pan has a toothed rack depending from the bottom of the pan. A roller chain is trained about a pair of guide rollers and over a drive sprocket between the rollers. A driving run of the chain between the guide rollers is nested or meshed with the rack in driving relation. Several of the chain rollers adjacent the downstream end of the driving run bear against the rack teeth to produce the linear motion of the rack and sliding pan; and the chain rollers located midway along the driving run and adjacent the upstream end of the driving run will not be in driving engagement with the rack teeth but will be advancing toward driving engagement as they approach the downstream end of the driving run.

As the chain rollers reach the downstream end of the driving run, they will begin to pull away from the rack, because they will follow around the guide roller. As the chain links begin to follow around the guide roller, they assume an oblique orientation with respect to the straight length of the chain in the driving run. Because of this oblique orientation, the center to center distance, in a direction along the rack, between the chain rollers at the opposite end of the chain link, becomes less than the tooth to tooth spacing of the rack. Therefore, the driving pressure applied by the chain roller against the tooth of the rack is immediately relieved as each chain roller passes over top dead center of the guide roller at the downstream end of the drive run. The roller will then pull away from the rack without wear to either the roller or the rack tooth. The pitch or roller to roller spacing of the chain is slightly greater than the pitch, or the tooth to tooth spacing of the rack. The drive is readily reversible and well adapted for operating reciprocating parts such as the reciprocating pan used to spread feed over the length of a bunk feeder.

DETAILED DESCRIPTION OF THE INVENTION

Figure 1:
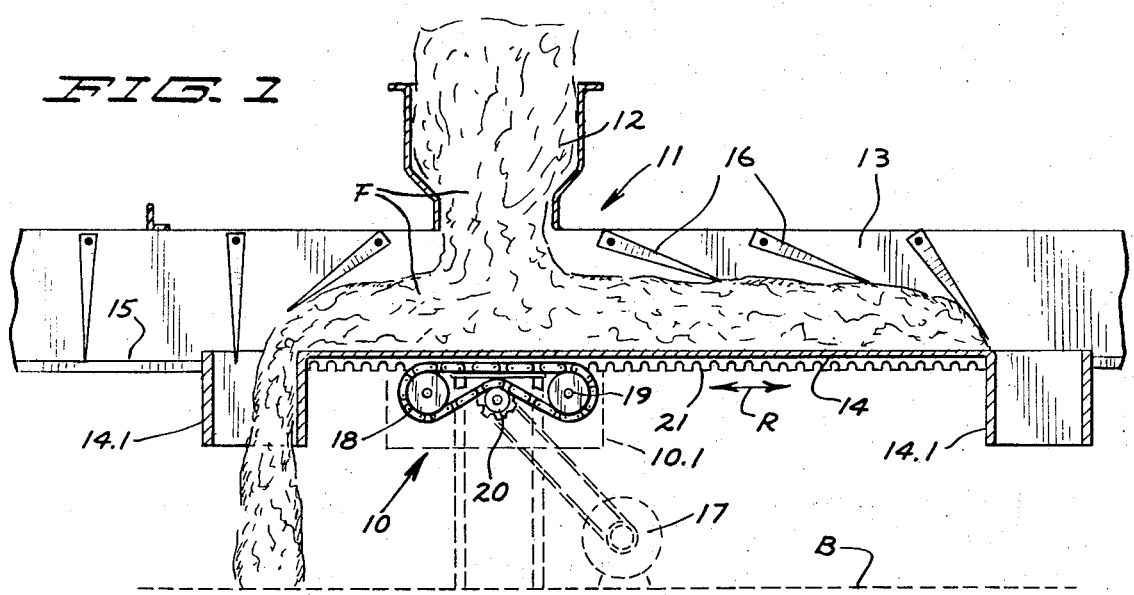
FIG. 1 is a vertical section view through the feed supply mechanism for distributing feed along a bunk feeder and incorporating the present invention.
Figure 2:
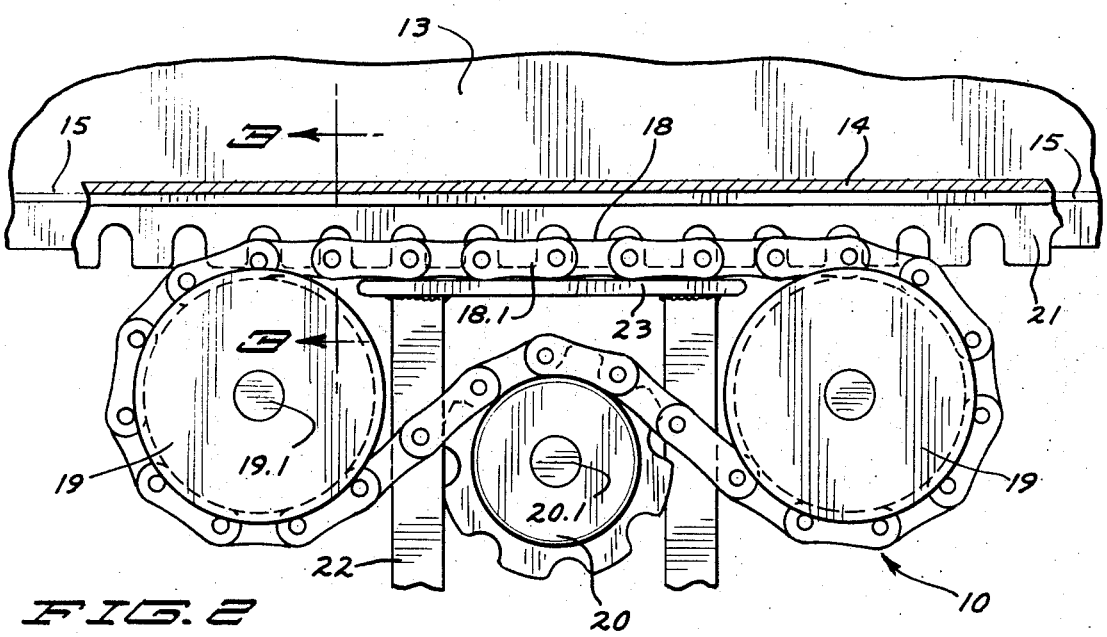
FIG. 2 is an enlarged detail elevation view of the drive connection between the motor and the sliding pan.
Figure 3:
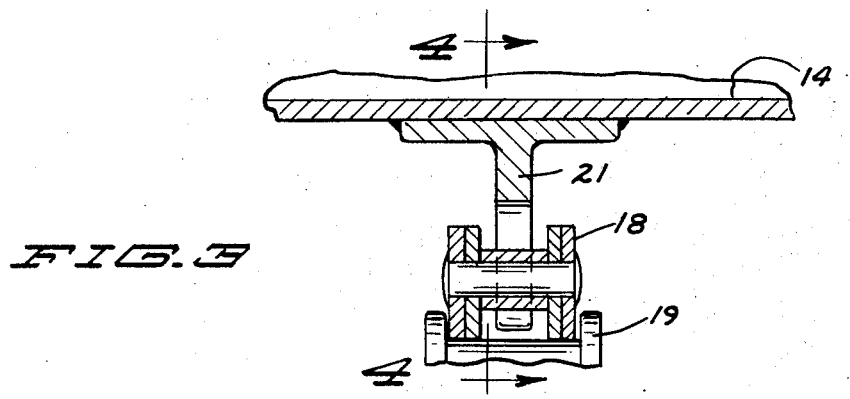
FIG. 3 is an enlarged detail section view taken approximately at 3—3 in FIG. 2.

One form of the invention is shown in the drawings and is described herein. The drive unit is indicated in general by numeral 10, and, as illustrated, is shown being used in connection with a supply mechanism 11 for distributing feed F along an elongate feed bunk B. The mechanism 11 includes a hopper and chute 12 supplying feed F into the space between a pair of upright retaining walls 13 between which an elongate sliding pan or tray 14 is reciprocated as indicated by arrow R. The pan or tray 14 is supported upon shoulders or ledges 15 which are a part of the wall structure 13, and it will be noted that there is no lip or other medium required for the purpose of holding the pan 14 downwardly onto the ledge 15.

The pan 14 has depending feed-guiding chutes 14.1 at its opposite ends through which the feed is guided downwardly onto the bunk. The mechanism 11 also has a plurality of swinging rake-like gates 16 which are pivoted to the wall structures 13 to swing about horizontal axes so as to ride over the top of the feed F on the pan 14 as the pan is traveling outwardly away from chute 12, and to subsequently dig into the feed on the pan as the feed tends to return with the pan in a direction inwardly toward the chute 12 so that the effect of the gates 16 is to restrain the feed and cause the feed to spill over the end of the pan and through the chutes 14.1 and downwardly onto the bunk B. The feed may be supplied continuously downwardly through the chute 12 and as the pan 14 is reciprocated, the feed will be distributed along and built up in the bunk B.

The drive mechanism 10 may be confined in a housing 10.1 beneath the pan 14 at a central location, and the motor 17 may be located off to the side of the unit in any convenient location. The drive mechanism 10 includes an endless roller chain 18, a pair of guide rolls 19, a drive sprocket 20 and an elongate rack 21 which is affixed to the bottom of pan 14 and extends longitudinally thereof throughout substantially the entire length of the pan. The guide rolls 19 are carried on shafts 19.1 journaled in bearings on the frame 22 which is rigid with the wall structure 13 of the feeder mechanism. The shafts 19.1 are oriented on axes extending normal to the rack 21 so that the rollers 19 are oriented longitudinally of the rack 21.

The chain 18 is trained around the guide rolls 19 and has a driving run 18.1 extending linearly between the guide rollers and in meshed and nested relation with the teeth of the rack 21.

The chain 18 also is trained over the drive sprocket 20 on a shaft 20.1 which is driven by an additional chain and sprocket drive from the motor 17. It is desirable that motor 17 be reversible and that suitable limit switches or other controls be incorporated for reversing the direction of rotation of motor 17 when the rack 14 reaches the end of its stroke so as to reverse the direction of motion of the pan 14.

The driving run 18.1 of the chain is supported by a bearing strip or plate 23 so as to be held in linear or straight condition as the chain passes along the driving run.

Figure 4:
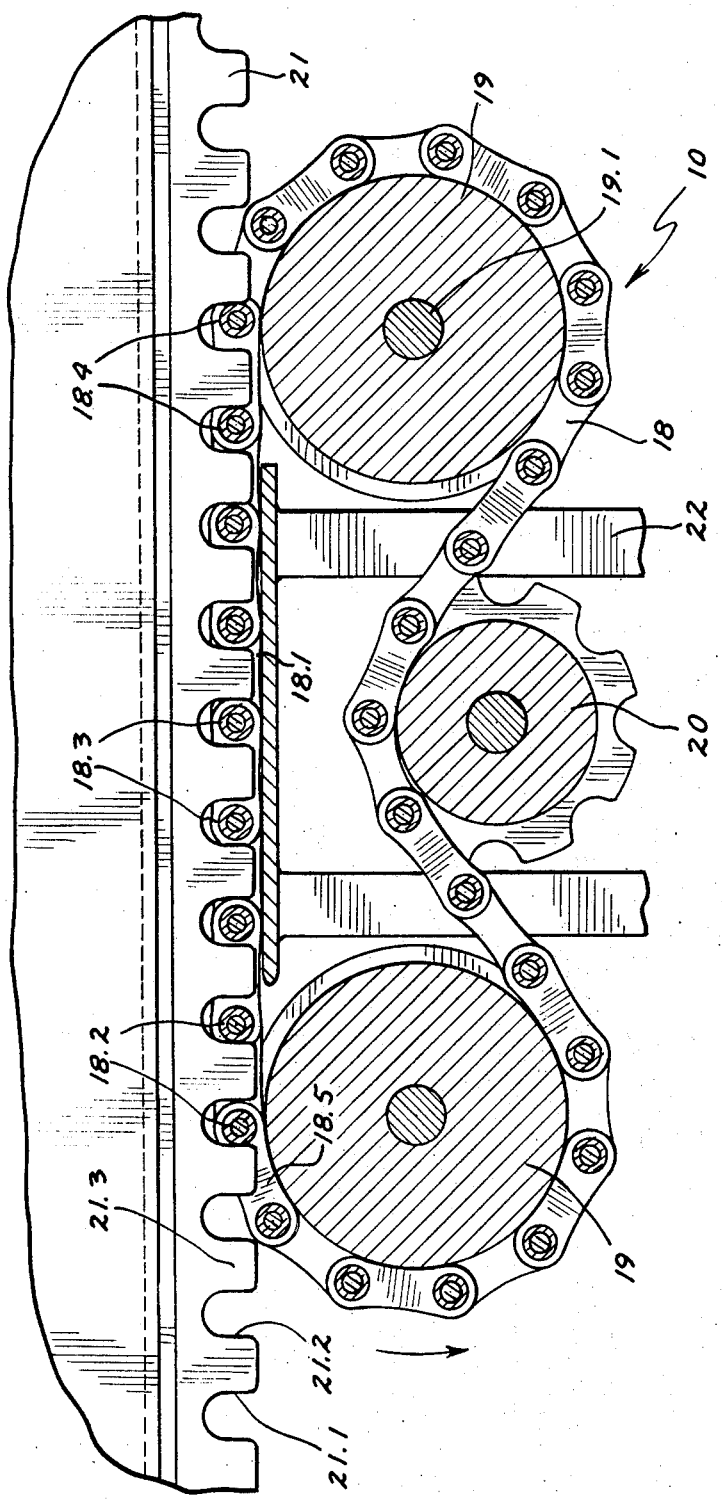
FIG. 4 is an enlarged detail section view taken approximately at 4—4 in FIG. 3.

The spacing between adjacent rollers of the chain 18, or the chain pitch length, is slightly greater than the spacing between adjacent teeth, or the rack pitch length of rack 21. Accordingly, not all of the chain rollers which are meshed with the rack 21 are in driving engagement with the rack teeth. One of the chain rollers, adjacent the downstream end of the straight driving run 18.1, and possibly one or two additional adjacent chain rollers, are also in driving engagement with the adjacent teeth of the rack. In FIG. 4, these chain rollers which are in driving engagement with the rack teeth are indicated by the numerals 18.2. The other chain rollers such as those indicated by numeral 18.3, approximately midway along the length of the driving run, and the rollers 18.4, located at the upstream end of the driving run, are out of driving engagement with the teeth of the rack 21. The spacing between adjacent teeth of the rack is sufficiently large as to accommodate a chain roller, with some additional excess space to provide for the location of the rollers 18.3 and 18.4 out of driving engagement with the teeth of the rack. As the rollers 18.3 and 18.4 progressively move toward the downstream end of the run, they progressively move toward the teeth of the rack and ultimately move into driving engagement with the rack teeth as they reach the downstream end of the driving run as indicated by the numeral 18.2.

It is to be particularly noted that the shape of the rack teeth and the fore and aft edges thereof is important in the present invention. The fore and aft edges 21.1 and 21.2 of the rack teeth 21.3 are both oriented normal to the overall orientation of the rack 21 and normal to the direction of movement of the chain in the driving run 18.1. As a result of this orientation of the edges 21.1 and 21.2, pressure applied by the chain roller against the tooth is relieved as soon as the chain roller passes over top dead center above shaft 19.1 as it begins to pass around guide roll 19 and as the corresponding link 18.5 begins to orient itself obliquely of the straight driving run 18.1. As the links are oriented obliquely of the rack, the center to center spacing between adjacent chain rollers, in a direction longitudinally of the rack (as contrasted with the direction of the link) is progressively reduced and as a result the pressure between the chain roller and the rack tooth is immediately relieved.

Because the pressure between the chain roller and rack tooth is immediately relieved as the roller passes over top dead center above shaft 19.1, there will be no substantial wear due to transverse movement of the chain roller as it retracts away from the rack 21. Similarly, as the chain rollers move into the rack at the right hand end of the driving run as illustrated in FIG. 4, there is essentially no pressure involved between the chain rollers and the rack teeth and no extensive wearing occurs as the chain rollers move into the rack. There is essentially no tendency on the part of the rack or pan 14 to lift upwardly as the drive produces great driving pressure, because of the normal orientation of the edges of the rack teeth and the production of the driving pressure principally between the rollers at the downstream driving end of the straight lineal run as the rollers 18.2 illustrated in FIG. 4.

It will be seen that we have provided a new and improved drive for producing lineal motion of a part such as a sliding pan from a rotary motor and wherein the roller chain only applies driving pressure against the rack at one portion of an elongate driving run which is meshed with the rack, but with a number of chain rollers in the upstream portion of the driving run being out of driving engagement with the rack teeth.

What is claimed is:

1. A drive for producing linear motion of a slide or the like, comprising a rack on the slide and having regularly spaced teeth,
   a stationary frame, along which the rack and slide may move,
   a powered drive unit on the frame to remain stationary as the rack and slide move therealong, the powered drive unit including an endless roller chain, a pair of chain guiding rolls and means applying driving force to the chain, and guide rolls being spaced from each other in a direction along the rack and disposed in close proximity to the rack to revolve on parallel axes extending transverse to the rack,
   the endless roller chain being trained over said guide rolls and having a straight driving run extending along and parallel to the rack and meshed with the rack teeth, the chain roller to chain roller pitch length of the endless roller chain being greater than the tooth to tooth spacing pitch length of the rack, at least one of the chain rollers adjacent the downstream end of the driving run being in driving engagement with the adjacent rack tooth, the chain rollers located midway along the driving run and adjacent the upstream end being spaced from and out of driving engagement with the rack teeth and progressively moving toward and into driving engagement with rack teeth as the chain rollers approach the downstream end of the driving run.

2. The linear motion producing drive according to claim 1 and said rack teeth having chain roller engaging edges through which the driving force is applied from the chain to the rack, said edges extending normal to the straight driving run of the roller chain.

3. The linear movement producing drive according to claim 2 wherein the rack teeth have opposite fore and aft edges, both of said fore and aft edges being oriented normal to the straight driving run of the chain, and said powered drive unit thereby being adapted for reverse running to produce reciprocation of the rack and slide.

4. The linear movement producing drive according to claim 1 and said powered drive unit also including a chain engaging drive sprocket disposed between said quide rolls and pulling the endless roller chain around one of the guide rolls and toward the downstream end of the driving run.

5. A drive for producing linear movement of a sliding pan in a distributing mechanism for spreading feed along the length of an elongate bunk feeder, or the like, comprising:
   a rack extending along the pan in a direction parallel to the direction of sliding thereof, and said rack having regularly spaced teeth with fore and aft edges oriented normal to the longitudinal direction of motion of the rack,
   a powered and reversible drive unit including an endless roller chain and a pair of chain guide rolls and a reversibly powered sprocket, said guide rolls being spaced from each other along the rack and positioned adjacent the rack on axes extending transversely of the rack, said drive sprocket being positioned between the guide rolls and spaced from the rack, and said endless roller chain being trained around said guide rollers and over said sprocket to be driven thereby and pulled around one of the guide rolls thereby, said endless roller chain also having a straight driving run extending along and parallel to the rack and in meshed relation with the teeth of the rack, the chain roller to chain roller pitch length of the chain being greater than the tooth to tooth spacing pitch length of the rack, at least one of the chain rollers adjacent the downstream end of the driving run being in driving engagement with the adjacent rack tooth, the chain rollers having a size smaller than the spacing between adjacent teeth of the rack, the chain rollers located midway along the driving run and adjacent the upstream end of the driving run being spaced from and out of driving engagement with the rack teeth and progressively moving toward and into driving engagement with the rack teeth as the rollers progressively move toward the downstream end of the driving run.

6. A drive for producing linear motion of a slide or the like comprising an elongated rack on the slide, the elongated rack having regularly spaced teeth along its length, chain guide rolls spaced longitudinally of the rack and a powered, endless roller chain trained around the guide rolls to provide a straight chain driving run between the guide rolls with the rollers of the chain in the straight driving run meshing with the rack teeth, the chain rollers having a size smaller than the spacing between adjacent rack teeth, and the roller to roller pitch length of the chain being greater than the tooth to tooth pitch length of the rack.

7. A drive for producing linear motion of a slide or the like, comprising a rack on the slide and having regularly spaced teeth, a stationary frame, along which the rack and slide may move, a powered drive unit on the frame to remain stationary as the rack and slide move therealong, the powered drive unit including an endless roller chain, a pair of chain guiding rolls and means applying driving force to the chain, said guide rolls being spaced from each other in a direction along the rack and disposed in close proximity to the rack to revolve on parallel axes extending transverse to the rack, the endless roller chain being trained over said guide rolls and having a straight driving run extending along and parallel to the rack and meshed with the rack teeth, at least one of the chain rollers adjacent the downstream end of the driving run being in driving engagement with the adjacent rack tooth, the chain rollers having a size smaller than the spacing between adjacent rack teeth, and the roller-engaging edges of each rack tooth being perpendicular to the direction of travel of the roller chain in its straight driving run, whereby the driving force applied by the roller chain to the rack urges the rack solely in the direction of travel of the roller chain in its straight driving run.

* * * * *

UNITED STATES PATENT OFFICE
CERTIFICATE OF CORRECTION

Patent No. 3,824,871　　　　　Dated July 23, 1974

Inventor(s) Leo J. Loesch; Claude E. Loesch

It is certified that error appears in the above-identified patent and that said Letters Patent are hereby corrected as shown below:

Claim 1, line 19, change "and" to --said--.

Signed and sealed this 29th day of October 1974.

(SEAL)
Attest:

McCOY M. GIBSON JR.　　　　　C. MARSHALL DANN
Attesting Officer　　　　　　Commissioner of Patents